US010786820B2

(12) United States Patent
Bergström et al.

(10) Patent No.: US 10,786,820 B2
(45) Date of Patent: Sep. 29, 2020

(54) METHOD FOR CITRUS FRUIT PROCESSING

(71) Applicant: ALFA LAVAL CORPORATE AB, Lund (SE)

(72) Inventors: Lennart Bergström, Grödinge (SE); Morgan Persson, Vendelsö (SE); Bram De Meulemeester, Hägersten (SE)

(73) Assignee: ALFA LAVAL CORPORATE AB, Lund (SE)

( * ) Notice: Subject to any disclaimer, the term of this patent is extended or adjusted under 35 U.S.C. 154(b) by 555 days.

(21) Appl. No.: 15/031,994

(22) PCT Filed: Oct. 27, 2014

(86) PCT No.: PCT/EP2014/072974
§ 371 (c)(1),
(2) Date: Apr. 25, 2016

(87) PCT Pub. No.: WO2015/063017
PCT Pub. Date: May 7, 2015

(65) Prior Publication Data
US 2016/0271626 A1 Sep. 22, 2016

(30) Foreign Application Priority Data

Oct. 29, 2013 (EP) .................................... 13190701

(51) Int. Cl.
*B04B 11/02* (2006.01)
*A23L 2/70* (2006.01)
(Continued)

(52) U.S. Cl.
CPC ................ *B04B 11/02* (2013.01); *A23L 2/70* (2013.01); *A23N 1/003* (2013.01); *B04B 1/12* (2013.01); *B04B 1/14* (2013.01)

(58) Field of Classification Search
CPC ... B04B 1/00; B04B 1/12; B04B 11/02; A23L 2/70; A23L 2/72; A23L 2/00; A23N 1/003
See application file for complete search history.

(56) References Cited

U.S. PATENT DOCUMENTS 3,535,158 A * 10/1970 McBride ................. B04B 11/02
127/13
4,828,865 A 5/1989 Kohlstette et al.
(Continued)

FOREIGN PATENT DOCUMENTS

CN 102176841 A 9/2011
CN 102871525 A 1/2013
(Continued)

OTHER PUBLICATIONS

English translation of a Chinese Office Action and Search Report for Chinese Application No. 201480059432.8, dated May 3, 2017.
(Continued)

*Primary Examiner* — Ericson M Lachica
(74) *Attorney, Agent, or Firm* — Birch, Stewart, Kolasch & Birch, LLP

(57) ABSTRACT

The present invention provides a method for citrus fruit processing comprising the steps of introducing liquid citrus fruit material to be processed via an inlet to a centrifugal separator being mechanically hermetically sealed at the inlet and at the liquid outlets; separating the citrus fruit material in the separator to obtain at least a liquid heavy phase and a liquid light phase, wherein the density of the liquid heavy phase is higher than the density of the liquid light phase; discharging the liquid heavy phase via a liquid heavy phase outlet and the liquid light phase via a liquid light phase outlet of the separator; measuring at least one parameter of the discharged liquid heavy phase and/or liquid light phase, wherein the parameter is related to a concentration of the heavy phase in the liquid light phase, or vice versa; and (Continued)

adjusting the counter pressure of the liquid heavy phase outlet with respect to the liquid light phase outlet, or vice versa, based on the measurement in step d) so as to control the concentration of the heavy phase in the liquid light phase, or vice versa, discharged from the separator. The present invention further provides a system for performing the method.

14 Claims, 3 Drawing Sheets

(51) Int. Cl.
*B04B 1/14* (2006.01)
*A23N 1/00* (2006.01)
*B04B 1/12* (2006.01)

(56) References Cited

U.S. PATENT DOCUMENTS

| | | | |
|---|---|---|---|
| 5,447,063 A * | 9/1995 | Glassey | G01N 9/22 |
| | | | 73/433 |
| 2006/0204624 A1 * | 9/2006 | Patist | B01D 9/004 |
| | | | 426/283 |
| 2011/0189359 A1 * | 8/2011 | Pecoroni | A23L 2/02 |
| | | | 426/231 |
| 2013/0029828 A1 * | 1/2013 | Haggmark | B04B 11/02 |
| | | | 494/2 |
| 2013/0309376 A1 * | 11/2013 | Herberg | B04B 11/02 |
| | | | 426/495 |
| 2014/0151291 A1 | 6/2014 | Holzbauer et al. | |

FOREIGN PATENT DOCUMENTS

| | | |
|---|---|---|
| WO | WO 2010/043524 A1 | 4/2010 |
| WO | WO 2011/093784 A1 | 8/2011 |

OTHER PUBLICATIONS

European Decision Rejecting the Opposition, dated Dec. 6, 2018, for European Application No. 13190701.6.
Meier, "No Question Hydro-Hermetic or Fully-Hermetic Seal?," Separator's Digest, 2011, Edition 2, pp. 44-47 (12 pages total), with English translation.
Pecoroni et al., "Separators, Decanters and Process Lines from GEA Westfalia Separator for Citrus Processing," GEA Mechanical Equipment, 2013, pp. 1-39 (40 pages total).

* cited by examiner

METHOD FOR CITRUS FRUIT PROCESSING

FIELD OF THE INVENTION

The present invention relates to the field of continuous citrus fruit processing, such as separation of pulp from citrus fruit juice, using high-speed centrifugal separators.

BACKGROUND OF THE INVENTION

The pulp of a citrus fruit is the juice vesicles or the membranous content of the fruit which contain the actual juice. After extraction of juice from a citrus fruit using extraction equipment, the extracted liquid fruit juice usually has a high content of pulp. Depending on the application, different pulp contents may be desired in the clarified, final, juice product. Therefore, the amount of pulp in extracted fruit juice is reduced by means of high speed centrifugal separators. Such equipment separates pulp from the fruit juice into a solid pulp phase as well as liquid phase having a low amount of pulp, i.e. a free-flowing pulp phase, and a clarified juice phase.

However, since there may be considerable variations in the pulp content of the fruit juice that is to be separated, there may be problems in how to operate the separator in order to achieve the best separation results. For example, if the separation is not sufficient, the clarified juice phase may contain too much pulp and the clarified juice phase may be present in the free-flowing pulp phase.

Furthermore, the above-discussed problems may also arise when in the extraction of peel oil from citrus fruits, e.g. when peel oil is to be separated from oil-in-water emulsions.

US 2011/189359 discloses a centrifugal separator and a system for influencing the pulp content of a fruit or citrus juice, in which a density of the discharged pulp phase from the separator is measured by a density flow-through measuring device. The measured density is used to control the process, e.g. to recirculate the liquid pulp phase to the inlet of the separator during start-up. However, such systems may be complicated and require a lot of equipment for monitoring and recirculating the separated juice phases.

There is however a need in the art for improved and simplified methods of for continuous citrus fruit processing.

SUMMARY OF THE INVENTION

A main object of the present invention is to provide a convenient method for citrus processing that is effective and controllable.

A further object of the present invention is to provide a controllable method for citrus processing without having to recirculate any processed material.

As a first aspect of the invention, there is provided a method for citrus fruit processing comprising the steps of
a) introducing liquid citrus fruit material to be processed via an inlet to a centrifugal separator being mechanically hermetically sealed at the inlet and at the liquid outlets;
b) separating the citrus fruit material in the separator to obtain at least a liquid heavy phase and a liquid light phase, wherein the density of the liquid heavy phase is higher than the density of the liquid light phase;
c) discharging the liquid heavy phase via a liquid heavy phase outlet and the liquid light phase via a liquid light phase outlet of the separator;
d) measuring at least one parameter of the discharged liquid heavy phase and/or liquid light phase, wherein the parameter is related to a concentration of the heavy phase in the liquid light phase, or vice versa; and
e) adjusting the counter pressure of the liquid heavy phase outlet with respect to the liquid light phase outlet, or vice versa, based on the measurement in step d) so as to control the concentration of the heavy phase in the liquid light phase, or vice versa, discharged from the separator.

The first aspect of the invention is advantageous in that measurements of parameters related to the concentration of the discharged liquid phases may be used to control the separation process, such as controlling the radial interface level of the phases in the separator. This control may be achieved without using recirculation of separated liquids, i.e. the separator does not have to process material that has already been processed in the separator. Instead, the counter pressure of the mechanically hermetically sealed separator is regulated based on the measured parameter. This may thus further optimize the process and prolong the lifetime of the separator compared to a process in which recycling is required.

The method of the first aspect of the invention may be a method for continuous citrus fruit processing, i.e. the measuring of step d) may be performed continuously.

Liquid citrus fruit material refers to any kind of liquid material having a constituent originating from citrus fruits, such as extracted fruit juice or an emulsion comprising citrus peel oil. Thus, the liquid citrus fruit material may be a liquid or a liquid material comprising solids, i.e. a slurry, or any material obtained by washing any material originating from citrus fruits.

A centrifugal separator refers to a separator in which material is separated due to centrifugal forces. Such a separator may comprise a rotor body which is rotatable around an axis of rotation (R). The axis of rotation may be a vertical axis. The rotor body may have a separation chamber for separating e.g. solid particles from a liquid mixture and separating different liquid components depending on their density. The separator has thus an inlet for the material or liquid mixture that is to be separated and at least one outlet for separated liquid and/or solid material. The inlet may be located at the top or bottom of the separator, e.g. as close to the rotational axis as possible. As an example, the inlet may be located at the bottom, such that the material or liquid mixture that is to be separated is fed into the separation chamber through a spindle that supports the rotor body. Thus, the separator may be bottom fed. The separation chamber may further comprise a stack of separation plates, e.g. frustoconical separation discs, for enhancing the separation efficiency.

A centrifugal separator being mechanically hermetically sealed at the inlet and at the liquid outlets refers to a centrifugal separator having a mechanical seal at the inlet and/or the outlet. Consequently, the inlet may be a hermetic inlet. A hermetic inlet is sealed from the surroundings of the rotor and is arranged to be filled with fluid product during operation. Thereby the inlet and the separation chamber are connected in a pressure communicating manner. Furthermore, the outlet may consequently be a hermetic outlet. A hermetic outlet is sealed from the surroundings of the rotor and is arranged to be filled with fluid product during operation.

In a centrifugal separator being hermetically sealed at the inlet and at the liquid outlet, separated liquid phases may be pumped out under pressure, e.g. by means of a built-in pump disc, to at least obtain a required outlet pressure. In order to create a flow of process fluid through such a hermetic separator, an inlet pressure may be provided to overcome the pressure drop in the separator The centrifugal separator may further comprise discharge port for discharging accumulated solids at the periphery of the separation chamber. Thus, in contrast to separators having a pairing disc at the liquid outlets, the mechanically hermetically sealed separator has no liquid-air interfaces at the outlets.

Step b) of the method thus involves separating the liquid citrus fruit material in the separator so as to obtain different liquid phases having different densities. The separation of step b) may further yield a solid fraction, or sludge phase, that may be accumulated at the periphery of the separation chamber.

The discharging of step c) involves discharging the liquid phases in different liquid outlets, such as continuously withdrawing the liquid phases. The outlets may be located at the top of the separator. Step c) may further include discharging separated solid material. Discharge of solid material, or sludge, may be performed intermittently from a radially outer portion of the separation chamber for intermittent discharge via a plurality of discharge ports which are opened by means of an operating slide.

The measuring of an parameter of step d) may be performed in-line, such as directly on one or both of the liquid phases discharged from the separator. The measurement may thus be performed on a separated phase when the phase is in flowing condition. Thus, the measurements of step d) may be performed in outlets pipes connected to the liquid outlets of the separator. Furthermore, a measurement of step d) may be performed semi in-line, i.e. a sample may be temporally withdrawn from a liquid outlet or outlet pipe, the measurement may be performed on the withdrawn sample and the sample may then be optionally returned to the outlet or outlet pipe.

The concentration of the heavy phase in the liquid light phase or vice versa refers to the concentration of the heavy phase in the liquid light phase or the concentration of the light phase in the liquid heavy phase.

In the separation process, the discharged liquid heavy phase may contain some light phase, and the discharged liquid light phase may contain some heavy phase. The measured parameter may thus be related to the concentration of the heavy phase in the heavy phase outlet, the concentration of the heavy phase in the light phase outlet, the concentration of the light phase in the heavy phase outlet, and/or the concentration of the light phase in the light phase outlet. Usually, parameter may be related to all of the above concentrations, since adjusting the separation process to affect the concentration in one liquid outlet usually means that the concentration in the other outlet also is affected.

The counter pressure refers to the pressure in any liquid outlet. Step e) may thus comprise adjusting the counter pressure of the liquid heavy phase outlet with respect to the liquid light phase outlet and/or adjusting the counter pressure of the liquid light phase outlet with respect to the liquid heavy phase outlet.

Adjusting the counter pressure may thus be increasing the counter pressure.

Consequently, in embodiments of the first aspect of the invention, step d) comprises measuring at least one parameter of the discharged liquid heavy phase, and step e) comprises adjusting the counter pressure of the liquid heavy phase outlet of the separator with respect to the liquid light phase outlet.

In embodiments of the first aspect of the invention, step d) comprises measuring at least one parameter of the discharged liquid heavy phase, and step e) comprises adjusting the counter pressure of the liquid light phase outlet of the separator with respect to the liquid heavy phase outlet.

In embodiments of the first aspect of the invention, step d) comprises measuring at least one parameter of the discharged liquid light phase, and step e) comprises adjusting the counter pressure of the liquid heavy phase outlet of the separator with respect to the liquid light phase outlet.

In embodiments of the first aspect of the invention, step d) comprises measuring at least one parameter of the discharged liquid light phase, and step e) comprises adjusting the counter pressure of the liquid light phase outlet of the separator with respect to the liquid heavy phase outlet.

In embodiments of the first aspect of the invention, the method does not comprise any recirculation of the discharged liquid heavy phase and/or discharged liquid light phase to the centrifugal separator.

As discussed above, the method may facilitate excluding recirculation of any discharged phase to the separator. This is advantageous in that the separated citrus material does not have to be further processed in the separator, i.e. the separator is utilized more efficiently. As an example, the concentration of the liquid phases may be controlled solely based on the measurements of step d) and the adjusting of step e).

The at least one parameter related to the concentration of the heavy phase in the liquid light phase, or vice versa, may for example be the viscosity of a liquid phase, the mass density of the liquid phase, the optical density or the turbidity of the liquid phase or any combination thereof.

As an example, the method may comprise measuring at least two parameters related to the concentration of the liquid phase may be measured, such as at least two of the parameters above.

Consequently, in embodiments of the first aspect of the invention, the parameter of step d) is the viscosity.

The inventors have found that it may be advantageous to measure the viscosity of the liquid phase, since the viscosity is a more direct measurement of the concentration compared to e.g. the mass density. The viscosity may further not vary significantly between types of citrus fruit, which means that the viscosity may be a good measure for a variety of citrus fruits. If the viscosity is used, then a relative value of the viscosity may be a convenient parameter to measure.

Furthermore, as discussed above, the parameter may be the turbidity. If the turbidity is used, then the absolute value of the turbidity may be a convenient parameter.

In embodiments of the first aspect of the invention, step e) comprises adjusting a valve in the liquid heavy phase outlet and/or liquid light phase outlet Thus, a valve arranged at the liquid heavy phase outlet and/or the liquid light phase outlet may be used to regulate the counter pressure of a liquid outlet with respect to another liquid outlet. The valve may be a regulating valve.

In embodiments of the first aspect of the invention step e) comprises adjusting the counter pressure so as to keep the measured parameter close to a reference value.

"Close to a reference value" may be adjusting the counter pressure such that the measured parameter value stays substantially at a reference value or within a reference interval, wherein the reference interval comprises the reference value. The reference interval may for example be the reference value ±5%, or the reference value ±10%.

Thus, step e) may comprise comparing the measured parameter of step d) with a reference value, and if the parameter value is below or above the reference value or reference interval, then adjusting the counter pressure until the measured parameter value again stays close to the reference parameter or within the reference interval.

The reference value may be set before starting the method of the present invention, i.e. a pre-set reference value determined before citrus material has been processed, or the reference value may be set during operation. For example, liquid citrus material may be processed, the counter pressure may be varied and when a desired concentration is obtained in the first and/or liquid light phase outlet, the parameter may be measured and that measured parameter value may be used as a set-point or nominal value. Thus, the reference value may be a relative value set during operation of the separator. This means that the absolute value of the parameter does not need to be measured, but only a relative value. Thus, if for example the viscosity is measured, it may not be necessary to measure the absolute viscosity, but only changes or fluctuations of the viscosity around a set reference value.

In embodiments of the first aspect of the invention, the method is for continuous depulping of citrus juice, the liquid heavy phase is a liquid pulp phase and the liquid light phase is a clarified juice phase, and further, the parameter of step d) is related to the concentration of pulp. The concentration of pulp may thus be the concentration of pulp in the liquid heavy phase outlet or the concentration of pulp in the liquid light phase outlet.

Thus, the method may be for controlling the pulp content of clarified citrus juice. Then, the inlet mixture to the separator may be citrus fruit juice comprising pulp, and the separator may separate the inlet mixture to a clarified juice phase comprising no or small amounts of pulp, a liquid pulp phase having a higher density than the clarified juice. The separator may also intermittently discharge solid pulp that accumulates at the periphery of the separation chamber.

If the method is for continuous depulping of citrus juice, then the parameter may be the viscosity and the viscosity may be measured in the liquid pulp phase.

The viscosity is a convenient parameter that may directly be related to the concentration of pulp in the fruit juice or liquid pulp phase, as discussed above. The present embodiment further provides for adjusting the counter pressure so as to provide a fruit juice having a pulp content within a specific interval.

In other words, the method of the first aspect of the invention may be a method for continuous citrus fruit depulping comprising the steps of
  a) introducing citrus fruit juice comprising pulp to be processed via an inlet to a centrifugal separator being mechanically hermetically sealed at the inlet and at the liquid outlets;
  b) separating the citrus fruit material in the separator to obtain at least a liquid pulp phase and a clarified juice phase, wherein the density of the liquid pulp phase is higher than the density of the clarified juice phase;
  c) discharging the liquid pulp phase via a liquid heavy phase outlet and the clarified juice phase via a liquid light phase outlet of the separator;
  d) measuring the viscosity of the discharged liquid pulp phase, wherein the viscosity is related to the concentration of pulp in the liquid pulp phase and in the clarified juice phase; and
  e) adjusting the counter pressure of the liquid heavy phase outlet with respect to the liquid light phase outlet, or vice versa, based on the measurement in step d) so as to control the concentration of pulp of the liquid pulp phase and the clarified juice phase discharged from the separator.

Steps d) and e) above may of course include, or may as a compliment include, measuring the viscosity of the clarified juice phase and adjusting the counter pressure of either the liquid heavy phase outlet or the liquid light phase outlet with respect to the other outlet.

As discussed above, step e) may comprise adjusting the counter pressure of the liquid heavy phase outlet with respect to the liquid light phase outlet. For example, by increasing the pressure on the heavy phase relative to the pressure on the light phase, the liquid/liquid interface position inside the separator may move towards the centre. Thereby, the heavy phase will 'occupy' a larger part of the disc stack. In other words, this may mean that more 'separation power' is on this phase, which will lead to a 'cleaner' heavy phase and more light phase is removed from the heavy phase. In this case this means: a 'dryer' pulp; pulp that contains less juice. Further, for example a viscosity meter may be used to check whether the 'dryness' is high enough and based on the value measured by this instrument a control loop in a control system may adjust automatically until the 'dryness' is at a desirable level.

As a further example, the method may further comprise measuring the turbidity of the clarified juice phase.

Thus, the viscosity may be measured in the liquid pulp phase and may be used for controlling the concentration, and the turbidity may further be used for verifying that the concentration of pulp of the clarified juice phase is acceptable.

As a further embodiment of the first aspect of the invention, the method is for separating peel oil from citrus juice, and the liquid heavy phase is an aqueous phase and the liquid light phase is peel oil.

Thus, the method may be for controlling the separation of peel oil. Then, the inlet mixture to the separator may be an oil-in-water emulsion, such as a 1-3% oil-in-water emulsion, wherein the oil phase comprises peel oil. The liquid may also be juice. The separator may thus separate the emulsion into an aqueous phase, e.g. water, which is discharged as the liquid of high density through the liquid heavy phase outlet, and peel oil, which is discharged as the liquid of lower density through the liquid light phase outlet. Thus, measuring a parameter related to the concentration of peel oil in the separated water and/or peel oil phase, then the method may be for optimizing the separation efficiency, e.g. for controlling that as much peel oil as possible is separated from the emulsion fed to the inlet.

If the method is used for controlling the concentration of peel oil, then the parameter may be the conductivity of the discharged peel oil phase. The conductivity may also be measured in the discharged aqueous phase or in both the aqueous phase and in the peel oil phase.

In other words, the method of the first aspect of the invention may be a method for continuous peel oil separation comprising the steps of
  a) introducing a liquid comprising peel oil via an inlet to a centrifugal separator being mechanically hermetically sealed at the inlet and at the liquid outlets;
  b) separating the liquid in the separator to obtain at least an aqueous phase and a peel oil phase, wherein the density of the aqueous phase is higher than the density of the peel oil phase;
  c) discharging the aqueous phase via a liquid heavy phase outlet and the peel oil phase via a liquid light phase outlet of the separator;

d) measuring the conductivity of the discharged peel oil phase, wherein the conductivity is related to the concentration of peel oil in the aqueous phase and in the peel oil phase; and e) adjusting the counter pressure of the liquid heavy phase outlet with respect to the liquid light phase outlet, or vice versa, based on the measurement in step d) so as to control the concentration of peel oil in the aqueous phase and in the peel oil phase discharged from the separator.

Steps d) and e) above may of course include, or may as a compliment include, measuring the conductivity of the aqueous phase and adjusting the counter pressure of either the liquid heavy phase outlet or the liquid light phase outlet with respect to the other outlet.

As a second aspect of the invention, there is provided a system for citrus fruit processing comprising a centrifugal separator comprising an inlet for liquid citrus fruit material to be processed, at least one liquid heavy phase outlet for discharging a liquid heavy phase and at least one liquid light phase outlet for discharging a liquid light phase; and wherein the separator further is mechanically hermetically sealed at the inlet and at the liquid outlets;

at least one measuring device arranged on the liquid heavy phase outlet and/or liquid light phase outlet for measuring a parameter of the discharged liquid heavy phase and/or liquid light phase; wherein the parameter is related to a concentration of the heavy phase in the light phase, or vice versa;

at least one valve arranged on the liquid heavy phase outlet and/or liquid light phase outlet; wherein the valve is for adjusting the counter pressure of the liquid heavy phase outlet with respect to the liquid light phase outlet, or vice versa;

a control unit for receiving the measured parameter value from the measuring device and for regulating the at least one valve based on the measured parameter value.

The terms and definition used in relation to the second aspect of the invention a as discussed under the first aspect of the invention above.

The at least one measuring device may be an in-line measuring device, i.e. be arranged for measuring the parameter in the flowing liquid.

The at least one valve may be a regulating valve. The system may for example comprise a valve at the liquid heavy phase outlet and a valve at the liquid light phase outlet.

The term "arranged on the outlet" means that a measuring device and/or a valve may be located at the outlet or arranged on an outlet pipe connected to the outlet of the separator. Thus, the at least one measuring device and/or the at least one valve may be arranged in an outlet pipe downstream from the outlet. "Arranged downstream from the outlet" refers to being arranged at a position such that liquid discharged first passes the outlet before reaching the downstream position.

The control unit may comprise a processor and an input/output interface for communicating with the at least one measuring device and the at least one valve. Thus, the processor may be adapted to access data from the control unit and generate and transmit control signals to the valve.

In embodiments of the second aspect of the invention, the control unit is further configured for comparing the measured parameter value with a reference value and for regulating the at least one valve based on the comparison.

Thus, a processor in the control unit may be adapted for comparing the received value from the measuring device with reference values. The reference values may be determined as discussed under the first aspect of the invention above.

In embodiments of the second aspect of the invention, the system is further comprising a flow transmitter downstream from the at least one valve.

The control unit may further be adapted for receiving values of the flow from the flow transmitter. Thus, the control unit may also be adapted to control or confirm that the outlet actually changes upon an adjustment or change of the counter pressure of the first and/or liquid light phase outlet of the separator with respect to the other outlet. Thus, a processor in the control unit may be adapted for receiving the flow values from the flow transmitter.

In embodiments of the second aspect of the invention, the at least one measuring device is a viscosity measuring device arranged on the liquid heavy phase outlet.

The viscosity measuring device may be an inline viscosity measuring device. As an example, the viscosity measuring device may be a vibrational viscometer. Such a viscometer may measure the damping of an oscillating electromechanical resonator immersed in a fluid. A vibrational viscometer may be suitable for measuring high-viscosity fluids, including liquids comprising fibers.

As an example, the viscosity measuring device may be able to measure a viscosity of up to 1,000 Pa·s.

The at least one measuring device may also be a mass density measuring device or an optical density measuring device, such as a turbidity measuring device.

In embodiments of the second aspect of the invention, the system comprises more than one measuring device, such as two or three measuring devices. For example, at least one measuring device may be arranged at the liquid heavy phase outlet and at least one measuring device may be arranged at the liquid light phase outlet. Such measuring devices may be the same or be adapted for measuring different parameters, such as one measuring device being adapted for measuring the viscosity and a further device for measuring the mass density. The sensitivity of the system may be increased if the system comprises more than one measuring device for measuring a parameter related to the concentration of a discharged liquid.

In embodiments of the second aspect of the invention, the system is further comprising a turbidity measuring device arranged on the liquid light phase outlet.

The turbidity measuring device may be a turbidity meter, e.g. adapted for measuring the cloudiness of the liquid of the liquid light phase outlet. The control unit may further be adapted to receive input from the turbidity measuring device.

An advantage with measuring the turbidity on the clarified phase is that small deviations in the separation may be detected.

As a further aspect of the invention, there is provided a method for continuous citrus fruit processing comprising the steps of introducing liquid citrus fruit material to be processed via an inlet to a centrifugal separator;

separating the citrus fruit material in the separator to obtain at least a liquid heavy phase of a first density and a liquid light phase of a second density, wherein the first density is higher than the second density;

discharging the liquid heavy phase via a liquid heavy phase outlet and the liquid light phase via a liquid light phase outlet of the separator;

measuring the viscosity of the discharged first and/or liquid light phase, wherein the viscosity is related to a concentration of the first and/or liquid light phase; and controlling the separation process of the separator based on the measurements of step d).

Thus, according to this further aspect of the invention, the viscosity is utilized for controlling the separation process during continuous citrus fruit processing using any type of centrifugal separator. The controlling may for example include adjusting a parameter or device so as to adjust the radial interface level in the separator. The step of controlling may further include recirculation of the discharged liquid of a first density and/or the discharged liquid of a second density until a desired value of the viscosity is measured. The terms and definitions used in relation to this further aspect of the invention are as discussed above.

DETAILED DESCRIPTION

The method and system according to the present disclosure will be further illustrated by the following description of an embodiment with reference to the accompanying drawings.

Figure 1:
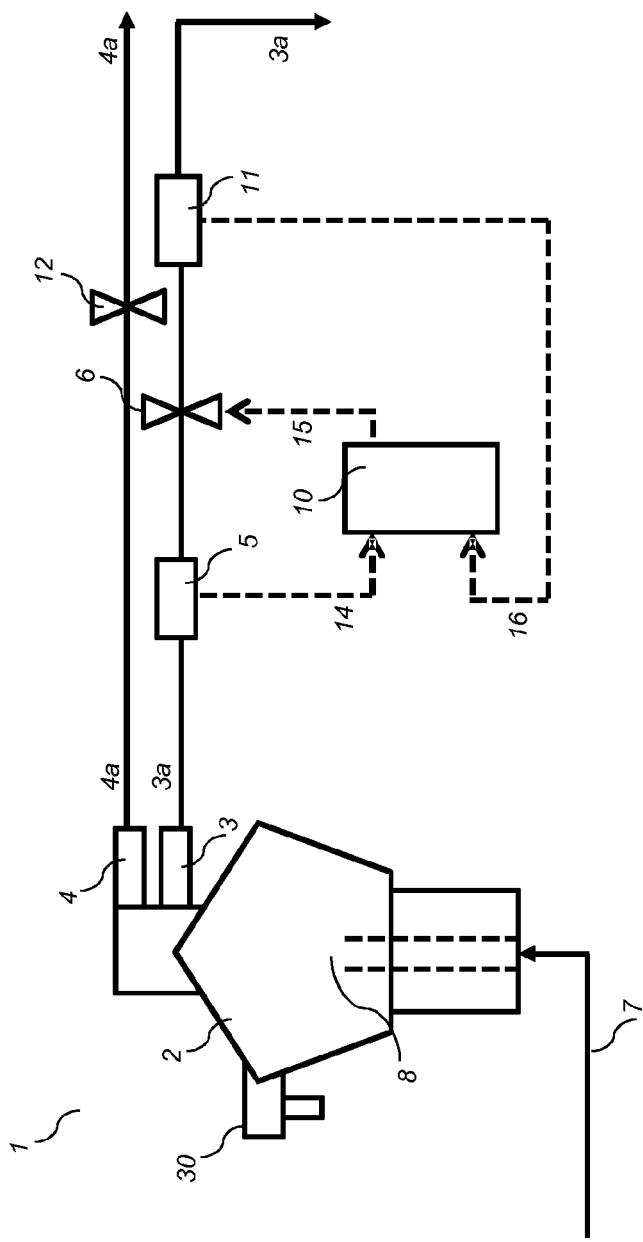
FIG. 1 shows a system for continuous citrus fruit processing according to an embodiment.

FIG. 1 discloses a system for continuous citrus fruit processing. The system is described in relation to continuous depulping of fruit juice, but may as well be utilized for continuous separation of peel oil from fruit juice. The liquid citrus fruit juice comprising pulp is fed by a pump via the inlet pipe 7 to the mechanically hermetically sealed separator 2. The feed is introduced centrally from below, i.e. the separator is bottom fed, and enters the separation space in the separator via inlet 8. A more detailed description of the working principles of the separator 2 is disclosed in relation to FIG. 3 below.

After being processed in the separator 2, the citrus fruit juice comprising pulp has been separated into a solid pulp phase collected by vessel 30, a liquid pulp phase discharged via liquid heavy phase outlet 3 and a clarified juice phase discharged via liquid light phase outlet 4. The liquid pulp phase has a higher density than the clarified juice. A viscosity meter 5 is arranged on the outlet pipe 3a downstream from the outlet 3. The viscosity meter measures the viscosity of the liquid pulp phase in-line and the measurement value is sent to the control unit 10, as indicated by arrow 14 in FIG. 1. The control unit 10 compares the measured viscosity with a reference value and depending on the comparison adjusts the counter pressure of the outlet 3 with respect to the outlet 4 by regulating valve 6, as indicated by arrow 15. The valve 6 is arranged further downstream of the outlet pipe 3a as compared to the viscosity meter. Furthermore, a regulating valve 12 is arranged on the outlet pipe 4a connected to the liquid light phase outlet for the clarified juice, and this valve 12 determines the counter pressure of the outlet 4 with respect to outlet 3. If the measured viscosity is above the reference value, this may indicate that the pulp concentration of the liquid pulp phase is too high. In analogy, if the measured viscosity is below the reference value, this may indicate that the pulp concentration of the liquid pulp phase is too low. As a compliment, the reference value may instead be a reference interval, and the control unit 10 may determine if the measured viscosity is outside the viscosity interval.

By regulating the valve 6, the counter pressure of outlet 3 with respect to outlet 4 is adjusted, which means that the interface level between the separated liquid pulp phase and the clarified juice in the separator is adjusted radially. Thus, valve 6 determines the back pressure and by regulating valve 6, the amount of pulp being present in the separated liquid pulp phase may be varied or controlled. If the counter pressure between liquid heavy phase outlet 3 and outlet 4 is decreased, then the amount of pulp in the liquid pulp phase may decrease and if the counter pressure between liquid heavy phase outlet 3 and outlet 4 is increased, then the amount of pulp in the liquid pulp phase may increase.

In this case, the reference value is a relative value that has been obtained manually, e.g. the operator has separated the liquid citrus juice material, adjusted the back pressure by adjusting valve 6, and when the desired pulp concentration in the liquid pulp phase in outlet pipe 3a and/or the desired pulp concentration in the clarified juice phase in outlet pipe 4a is obtained, the viscosity has been measured and this measurement has been used as a reference value. Then, the relative viscosity, i.e. the viscosity measured as compared to the reference, may be used to control the process instead of using measured absolute values of the viscosity. Thus, the method of the present disclosure may be used to keep the pulp concentration in the clarified juice phase and/or the liquid pulp phase substantially at a constant level, independent if the pulp concentration of the liquid citrus fruit material in the inlet pipe 7 varies.

The viscosity is in this example measured continuously.

Furthermore, a flow transmitter 11 is arranged further downstream on pipe 3a as compared to the regulating valve 6. The flow transmitter 11 measures the flow through the outlet pipe 3a. The flow transmitter may be used to contribute to the detection of a situation where the separator bowl is clogged with pulp In embodiments, the flow transmitter further sends the information to the control unit 10. Thus, the control unit 10 may be used to further control that the flow through the outlet pipe 3a is actually changed upon a change in the control valve 6.

Figure 2:
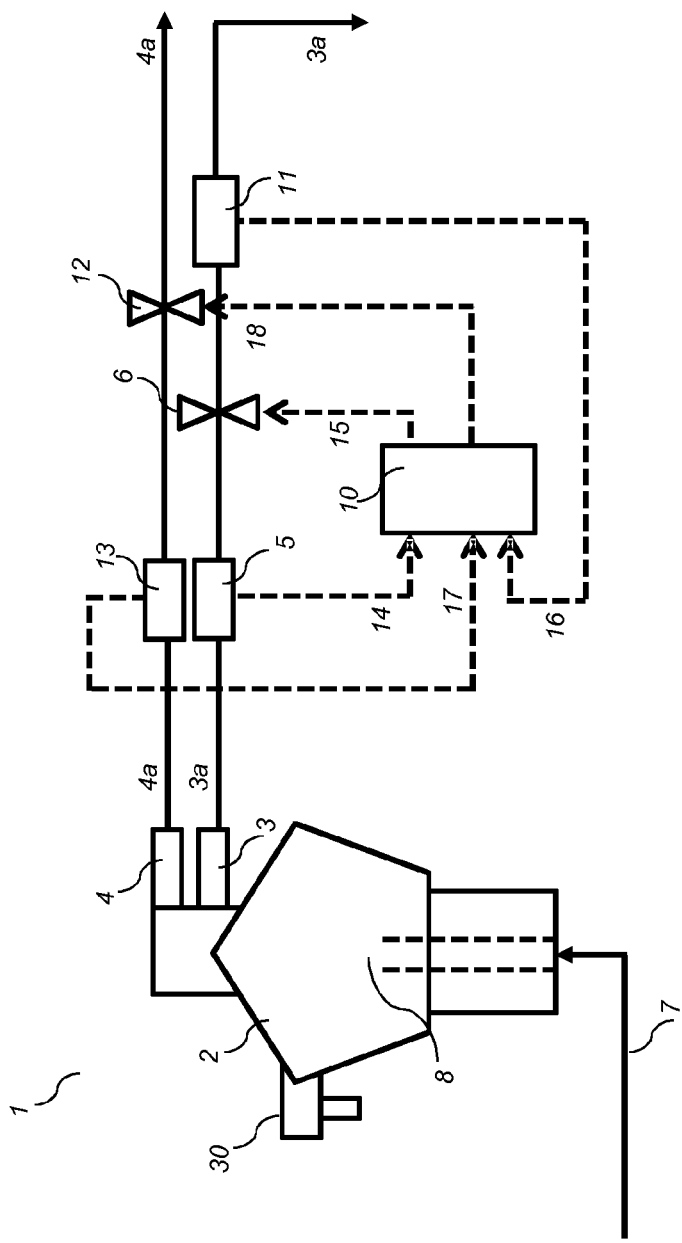
FIG. 2 shows a further system for continuous citrus fruit processing according to an embodiment.

A further example of a system according to the present disclosure is shown in FIG. 2. This system 1 functions as described in relation to FIG. 1 above but further comprises an additional viscosity meter 13 arranged in the outlet pipe 4a connected to the outlet for the clarified fruit juice. In this system, the control unit 10 also receives information from the additional viscosity meter 13, as indicated by arrow 17, and the control unit 10 is further arranged for adjusting the regulating valve 12, as indicated by arrow 18. The valve 12 is arranged on the outlet 4 and used to regulate the counter pressure of liquid light phase outlet 4 with respect to outlet 3. Thus, in this system the control unit 10 may compare the measured viscosity from viscosity meter 5 with a first reference value and further compare the measured viscosity from viscosity meter 13 with a second reference value, and base the regulating of valves 6 and 12 on the measurements from both viscosity meter 13 and viscosity meter 6. In analogy to what is described in relation to FIG. 1 above, the operator may run the separation process and regulate both valve 6 and 12 until the desired pulp concentration is obtained in either the clarified juice in pipe 4a and/or in the liquid pulp phase of pipe 3a. The viscosity may then be measured by viscosity meter 5 and be used as a first reference value, and the viscosity measured by viscosity meter 13 may be used as the second measurement value. The control unit 10 may then for example be programmed to adjust either one or both of valves 6 and 12 if the measured viscosity by viscosity meter 5 is above or below the first reference value and if the measured viscosity by viscosity meter 13 is above or below the second reference value.

Although the systems of FIGS. 1 and 2 have been described with respect to depulping of citrus juice, they may as well be used for separating peel oil from an oil-in-water emulsion, in which the peel oil is present in the oil phase of the emulsion. In such an application the measuring devices 5 and 13 may be a conductivity measuring device for measuring the conductivity of the discharge aqueous phase and the discharged peel oil phase, respectively. A 1-3% oil-in-water emulsion is then introduced in the separator 2 via inlet pipe 7. The separated peel oil phase is discharged via outlet 4 and the separated aqueous phase, having a higher density than the oil phase, is discharged via outlet 3a. The conductivity measuring device 5 is thus used to measure the amount of peel oil in the aqueous phase, and this measurement is used to control the separation process by using control unit 10 and regulating valve 6 and/or 12 as discussed in relation to the depulping process above.

Figure 3:
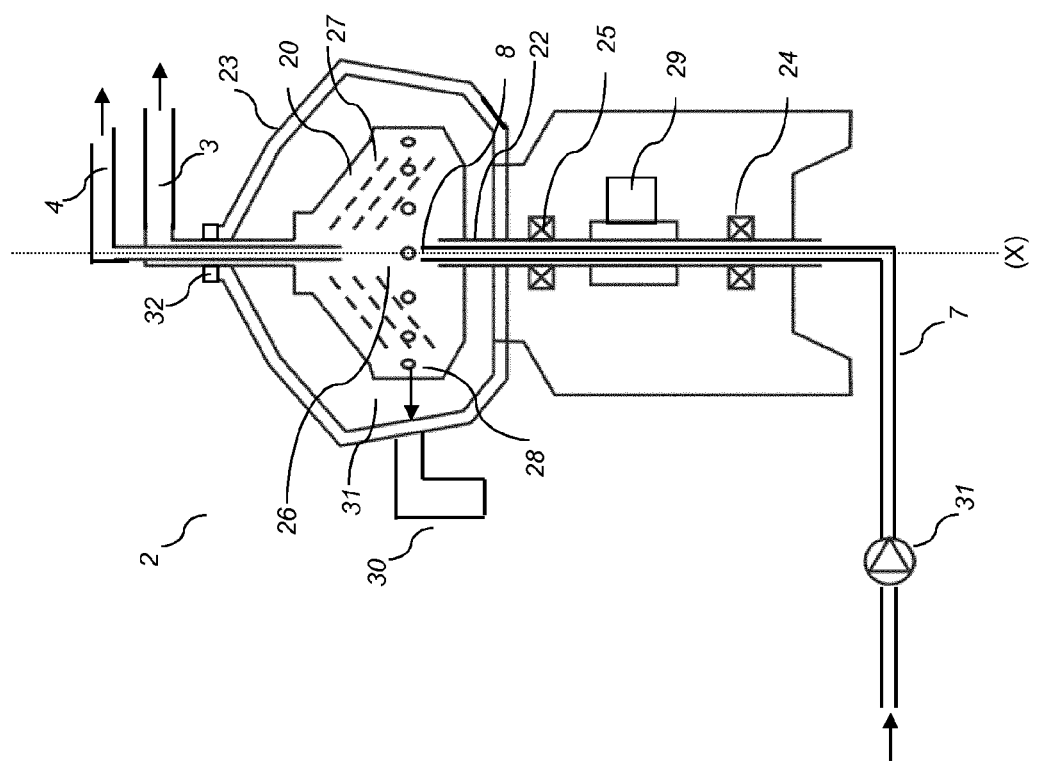
FIG. 3 shows a hermetic separator that may be used in the system as shown in FIGS. 1 and 2.

A schematic example of a centrifugal separator according to the invention is depicted in FIG. 3.

The centrifugal separator 2 comprises a rotor 20 arranged for rotation about an axis of rotation (X) by means of a spindle 3. The spindle 3 is supported in the frame 23 of the centrifugal separator in a bottom bearing 24 and a top bearing 25. The rotor 20 forms within itself a separation chamber 26 in which centrifugal separation of the liquid citrus fruit material takes place during operation. The centrifugal separator of the embodiments disclosed is of a so called hermetic type with a closed separation space 26, i.e. the separation space 26 is intended to be completely filled with liquid during operation. This means that no air or free liquid surfaces is meant to be present in the bowl. The separation space 26 is provided with a stack of frusto-conical separation discs 27 in order to achieve effective separation of the fluid. The stack of truncated conical separation discs 27 are examples of surface-enlarging inserts. These discs 27 are fitted centrally and coaxially with the rotor and comprise holes which form channels for axial flow of liquid when the separation discs 27 are fitted in the centrifugal separator.

An inlet 8 for introducing the liquid citrus fruit material for centrifugal separation extends into the rotor, providing the material to be separated to the separation space 26. The inlet 8 extends through the spindle 3, which takes the form of a hollow, tubular member. Introducing the liquid material from the bottom provides a gentle acceleration of the liquid. The inlet 8 is further connected to inlet pipe 7, in which pipe the liquid citrus fruit material to be separated is pumped by means of pump 31.

The rotor has extending from it a liquid light phase outlet 4 for a lower density component separated from the liquid citrus fruit material, and a liquid heavy phase outlet 3 for a higher density component, or heavy phase, separated from the liquid citrus fruit material. The outlets 3 and 4 extend through the casing 23, and the space 31 is sealed by a mechanical seal 32. The rotor is provided at its outer periphery with a set of radially sludge outlets 28 in the form of intermittently openable outlets for discharge of e.g. pulp and/or a higher density component in the liquid citrus material. This material is thus discharged from a radially outer portion of the separation chamber 26 to the space 31 round the rotor.

The centrifugal separator 2 is further provided with a drive motor 29. This motor 29 may for example comprise a stationary element and a rotatable element, which rotatable element surrounds and is so connected to the spindle 3 that during operation it transmits driving torque to the spindle 3 and hence to the rotor 20. The drive motor may be an electric motor. Furthermore, the drive motor 29 may be connected to the spindle 22 by transmission means. The transmission means may be in the form of a worm gear which comprises a pinion and an element connected to the spindle in order to receive driving torque. The transmission means may alternatively take the form of a propeller shaft, drive belts or the like, and the drive motor may alternatively be connected directly to the spindle.

The centrifugal separator further comprises a vessel 30 in the form of a cyclone connected to the space 31 and adapted to gathering sludge and liquid from the sludge outlets 28. The gathering vessel 30 is further connected to a discharge device in the form of a sludge pump for discharge of sludge and liquid present in the gathering vessel. The sludge pump is provided with a check valve function which prevents flow into the vessel via the sludge pump.

During operation of the separator in FIG. 3, the rotor 20 is caused to rotate by torque transmitted from the drive motor 29 to the spindle 22. Via the inlet 8, liquid citrus fruit material is brought into the separation space 26. In the hermetic type of inlet the acceleration of the liquid citrus fruit material is initiated at a small radius and is gradually increased while the liquid leaves the inlet and enters the separation space 26. Depending on the density, different phases in the liquid citrus fruit material is separated between the separation discs 27 fitted in the separation space 26. Heavier components in the liquid, such as pulp or liquid pulp phase, move radially outwards between the separation discs, whereas the phase of lowest density, e.g. the clarified juice phase, moves radially inwards between the separation discs and is forced through outlet 4 that is arranged at the radial innermost level in the separator. The liquid of higher density, such as a liquid pulp phase, is instead forced out through outlet 3 that is at a radial level that is larger than the radial level of outlet 4. Thus, during separation, an interphase between the liquid of lower density and the liquid of higher density is formed in the separation space 26. The radial level, i.e. the distance from rotation al axis X, of this interface level is in the hermetic separator determined by the counter pressure of outlets 3 and 4 of the separator. Solids, such as solid pulp, accumulate within the sludge phase outlets 28. Sludge is emptied intermittently from the separation space by the sludge outlets 28 being opened, whereupon sludge and a certain amount of fluid is discharged from the separation space by means of centrifugal force. The discharge of sludge may also take place continuously, in which case the sludge outlets 28 take the form of open nozzles and a certain flow of sludge and/or heavy phase is discharged continuously by means of centrifugal force. Sludge which is discharged from the separation space via the sludge outlets is conveyed from the surrounding space 31 to the gathering vessel 30 connected thereto, in which the sludge accumulates and from which it is pumped out by a sludge pump.

The invention is not limited to the embodiment disclosed but may be varied and modified within the scope of the claims set out below. The invention is not limited to the orientation of the axis of rotation X disclosed in the figures.

The term "centrifugal separator" also comprises centrifugal separators with a substantially horizontally oriented axis of rotation.

The invention claimed is:

1. A method for citrus fruit processing comprising the steps of:
   a) introducing liquid citrus fruit material to be processed via an inlet pipe to a centrifugal separator, the centrifugal separator having an inlet and liquid outlets, and being mechanically hermetically sealed at the inlet and at the liquid outlets, the liquid outlets including a liquid heavy phase outlet and a liquid light phase outlet;
   b) separating said liquid citrus fruit material in said centrifugal separator to obtain at least a liquid heavy phase and a liquid light phase, wherein the density of the liquid heavy phase is higher than the density of the liquid light phase;
   c) discharging said liquid heavy phase via the liquid heavy phase outlet and said liquid light phase via the liquid light phase outlet of said centrifugal separator;
   d) measuring at least one parameter of the discharged liquid heavy phase and/or liquid light phase, wherein said at least one parameter is related to a concentration of the liquid heavy phase in the liquid light phase, or a concentration of the liquid light phase in the liquid heavy phase; and
   e) radially adjusting an interface level between a separated liquid heavy phase and liquid light phase in the centrifugal separator by adjusting a counter pressure of the liquid heavy phase outlet with respect to the liquid light phase outlet, or a counter pressure of the liquid light phase outlet with respect to the liquid heavy phase outlet, when the concentration of the liquid heavy phase in the liquid light phase or the concentration of the liquid light phase in the liquid heavy phase is not at a desired value based on the measurement in step d), so as to control the concentration of the liquid heavy phase in the liquid light phase or the concentration of the liquid light phase in the liquid heavy phase discharged from the centrifugal separator,
   wherein the method does not comprise any recirculation of said discharged liquid heavy phase and discharged liquid light phase to the centrifugal separator, and the concentration of the liquid heavy phase in the liquid light phase and the concentration of the liquid light phase in the liquid heavy phase discharged from the centrifugal separator are controlled solely by the step d) of measuring the at least one parameter and step e) of adjusting radially adjusting the interface level.

2. The method according to claim 1, wherein the at least one parameter of step d) is a viscosity of the discharged liquid light phase.

3. The method according to claim 1, wherein step e) comprises adjusting a valve in the liquid heavy phase outlet and/or the liquid light phase outlet.

4. The method according to claim 1, wherein step e) comprises adjusting the counter pressure so as to keep the measurement of the at least one parameter at a value ±10% within a reference value.

5. The method according to claim 1, wherein the method is for continuous depulping of citrus juice and said liquid heavy phase is a liquid pulp phase and said liquid light phase is a clarified juice phase, and wherein said at least one parameter of step d) is related to a concentration of pulp in the liquid heavy phase outlet or a concentration of pulp in the liquid light phase outlet.

6. The method according to claim 5, wherein the at least one parameter is a viscosity measured in the liquid pulp phase.

7. The method according to claim 6, further comprising measuring the turbidity of the clarified juice phase.

8. The method according to claim 1, wherein the method is for separating peel oil from citrus juice, and wherein said liquid heavy phase is an aqueous phase and said liquid light phase is peel oil.

9. The method according to claim 8, wherein the at least one parameter is the conductivity of the discharged aqueous phase.

10. A system for citrus fruit processing comprising:
    a centrifugal separator comprising an inlet for liquid citrus fruit material to be processed, at least one liquid heavy phase outlet for discharging a liquid heavy phase and at least one liquid light phase outlet for discharging a liquid light phase, wherein said centrifugal separator is mechanically hermetically sealed at the inlet and at the liquid outlets;
    at least one measuring device arranged on said at least one liquid heavy phase outlet and/or said at least one liquid light phase outlet for measuring at least one parameter of said discharged liquid heavy phase and/or liquid light phase, wherein said at least one parameter is related to a concentration of the liquid heavy phase in the liquid light phase, or a concentration of the liquid light phase in the liquid heavy phase;
    at least one valve arranged on said liquid heavy phase outlet and/or liquid light phase outlet, wherein the at least one valve is for radially adjusting an interface level between a separated liquid heavy phase and liquid light phase in the centrifugal separator by adjusting a counter pressure of the liquid heavy phase outlet with respect to the liquid light phase outlet, or a counter pressure of the liquid light phase outlet with respect to the liquid heavy phase outlet, when the concentration of the liquid heavy phase in the liquid light phase or the concentration of the liquid light phase in the liquid heavy phase measured by the at least one measuring device is not at a desired value, so as to control the concentration of the liquid heavy phase in the liquid light phase or the concentration of the liquid light phase in the liquid heavy phase discharged from the centrifugal separator; and
    a controller for receiving the at least one measured parameter value from the at least one measuring device and for regulating the at least one valve based on the at least one measured parameter value,
    wherein the system is configured in such a manner that there is no recirculation of said discharged liquid heavy phase and discharged liquid light phase to the centrifugal separator, and the concentration of the liquid heavy phase in the liquid light phase and the concentration of the liquid light phase in the liquid heavy phase discharged from the centrifugal separator are controlled solely by controlling the at least one measuring device to measure the at least one parameter and the at least one valve to adjust the interface level.

11. The system according to claim 10, wherein the controller is further configured for comparing the at least one measured parameter value with a reference value and for regulating said at least one valve based on said comparison.

12. The system according to claim 10, further comprising a flow transmitter downstream from said at least one valve.

13. The system according to claim 10, wherein the at least one measuring device is a viscosity measuring device arranged on said liquid heavy phase outlet.

14. The system according to claim 13, further comprising a turbidity measuring device arranged on said liquid light phase outlet.

\* \* \* \* \*